M. LEITCH.
DISK WASHER.
APPLICATION FILED JAN. 28, 1916.
1,264,191.
Patented Apr. 30, 1918.
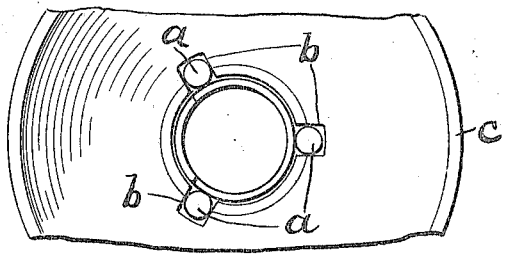
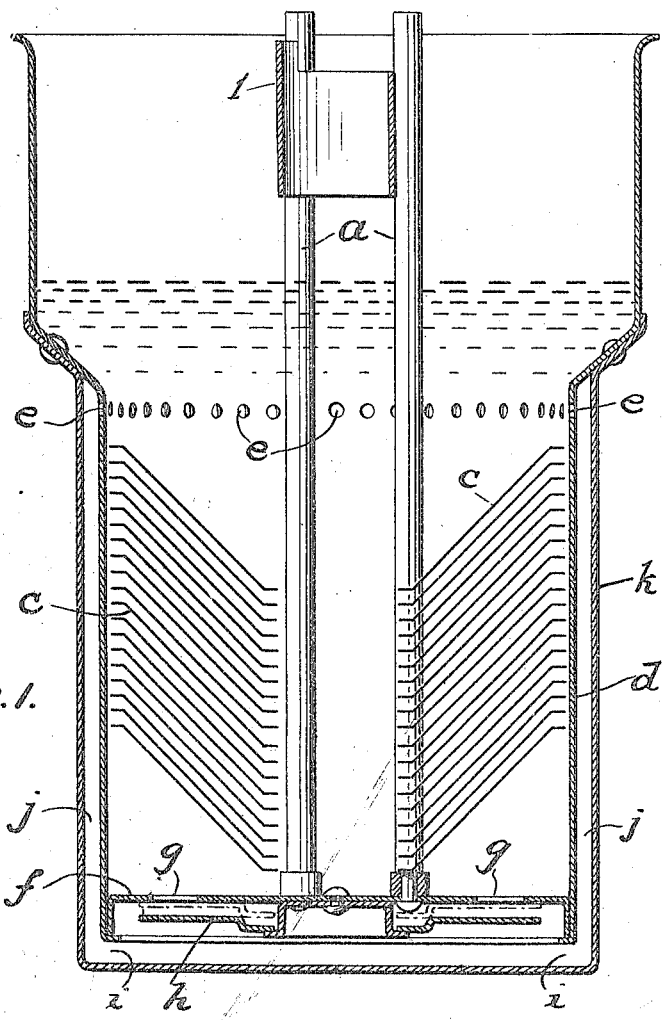
WITNESS:
Rob R Litchel
INVENTOR
Meredith Leitch
BY
Frank L Busser
ATTORNEY.

UNITED STATES PATENT OFFICE.

MEREDITH LEITCH, OF POUGHKEEPSIE, NEW YORK, ASSIGNOR TO THE DE LAVAL SEPARATOR COMPANY, A CORPORATION OF NEW JERSEY.

DISK-WASHER.

1,264,191.   Specification of Letters Patent.   Patented Apr. 30, 1918.

Application filed January 28, 1916. Serial No. 74,737.

*To all whom it may concern:*

Be it known that I, MEREDITH LEITCH, a citizen of the United States, residing at Poughkeepsie, county of Dutchess, and State of New York, have invented a new and useful Improvement in Disk-Washers, of which the following is a full, clear, and exact description, reference being had to the accompanying drawings, which form a part of this specification.

The object of the invention is to provide convenient and effective means for washing thoroughly, in a minimum quantity of water, the disks or liners used in cream separators and similar machinery. A further object is to provide means with which the disks may be thoroughly washed in hot water without bringing the operator's hands in contact with either the water or the disks.

A preferred embodiment of the invention is shown in the accompanying drawings, in which:—

Figure 1 is a vertical sectional view of the disk washer and disk holders.

Fig. 2 is a top view of the disk holder and disks.

My invention is so designed to operate in connection with a disk remover and replacer of any type, one example of which is shown in the Berrigan Patent No. 663,114, dated Dec. 4, 1900, which comprises a disk holder adapted to register with the disk supporting or retaining device in the separator bowl, whereby the disks may be slipped from the supporting device in the separator on to the disk holder. In the drawings the disk holder is shown as comprising three rods $a$ adapted to extend respectively through three recesses $b$ extending outwardly from the central hole in each disk $c$. The ring $l$, fastened between the rods $a$ near their upper ends, is provided with an extension which passes between two of the ribs on the tubular shaft of a separator, insuring the holder being always placed in the same position in the transferring operation. This ring also serves as a handle during the washing operation.

$d$ is a cylinder having an open bottom and a water inlet comprising a series of holes $e$ in a circle near the top. $k$ is a container inside of which the cylinder $d$ is fastened. The cylinder is shown as extending substantially above the holes $e$ to give more water space. $f$ is a piston attached to the end of the disk holder $a$ and having openings $g$ covered by a valve $h$ which opens to allow water to pass downward but closes to prevent its passing upward. An opening $i$ under the cylinder $d$ and a passage $j$ between the cylinder $d$ and the container $k$ allows water to pass from the inside of the cylinder, below the piston, to the openings $e$.

The operation is as follows: After using the separator the disks are transferred to the disk holder having, as described, the piston $f$. The washer is filled to above the openings $e$ with warm water having soap powder dissolved in it. The disk holder $a$, and with it the piston $f$ and the disks $c$, are then forced downward in the cylinder. This forces the water to pass upward through the passage $j$, jet out from the holes $e$ with considerable force and pass rapidly between the disks and upward through the central holes of the disks. As the piston and disks pass downward each disk in its turn receives the full force of the jets. When the piston is raised the water flows through the openings $g$ to the space under the piston which acts as a receiver for the drainage from the disks, and is ready for another passage through the passage $j$ and openings $e$. The piston thus operates as a pump to circulate the water through the passages $i$ and $j$, the jet orifices $e$ and the disks. A few strokes will clear the disks of all milk, cream and dirt. The dirty water is then emptied out and the washer filled with very hot clear water. A few strokes serve to thoroughly rinse the disks, which may then be shaken out loosely so as to fill the entire length of the holder and hung up in a warm place to dry.

What I claim as new and desire to secure by Letters Patent is:

1. In a disk washer, in combination, means affording a ring of jet orifices, a pump adapted to forcibly discharge the water from such orifices, a movable disk holder adapted to carry disks to be washed through the ring as the water is so discharged, and means connecting the holder and pump and permitting the pump to be moved in unison with said holder.

2. In a disk washer, the combination with circumferentially extending means affording ingress for water, of a holder upon which the disks, spaced apart, may be strung, one behind another, and means connected with the holder and operable therewith as the holder is moved to carry the disks successively past the water inlet, to force water through the inlet and between the disks.

3. In a disk washer, the combination of a vessel adapted to contain water and provided with a ring of jet orifices located within the vessel substantially above its bottom and substantially below its top, a carrier on which the disks are adapted to be strung one above another, said carrier being movable up and down to carry the disks through the ring, a receiver for drainage from the disks, means affording a water passage from the receiver to the jet orifices, and a pump operatively connected with the carrier adapted to circulate water through the water passage and discharge it through the jet orifices as the disks pass through the ring.

4. In a disk washer, the combination of a cylinder having a lower discharge end, a piston reciprocable therein, a disk carrier attached to the piston and adapted to support the disks above the piston, the cylinder having a ring of jet orifices which said disks are adapted to pass as they, with the piston, are forced downward in the cylinder, and means affording a passage from the discharge end of the cylinder to said jet orifices, to cause water to be forced therethrough coincidently with the movement past the orifices of the outer edges of the disks.

5. In a disk washer, the combination with a disk carrier adapted to receive the disks and hold them while being washed and a piston attached to the disk carrier, of a cylinder with an open bottom and having a ring of jet orifices, means affording a passage from the open bottom of the cylinder to the ring of jet orifices, said piston adapted to reciprocate in the cylinder and force water through the jets while the attached disk carrier carries the disks through the ring.

In testimony of which invention, I have hereunto set my hand, at Poughkeepsie, on this 21st day of January, 1916.

MEREDITH LEITCH.

Witnesses:
CHARLES L. POWELL,
HOWARD A. SNYDER.